United States Patent
Manser et al.

(10) Patent No.: US 7,111,858 B2
(45) Date of Patent: Sep. 26, 2006

(54) RETRACTABLE STEP SYSTEM

(75) Inventors: Andrew R. Manser, Neenah, WI (US); Kenneth P. Sebo, Reedsville, WI (US); Daniel Daemmrich, Menasha, WI (US)

(73) Assignee: Pierce Manufacturing Company, Appleton, WI (US)

( * ) Notice: Subject to any disclaimer, the term of this patent is extended or adjusted under 35 U.S.C. 154(b) by 182 days.

(21) Appl. No.: 10/874,789

(22) Filed: Jun. 23, 2004

(65) Prior Publication Data

US 2005/0285365 A1    Dec. 29, 2005

(51) Int. Cl.
*B60R 3/02* (2006.01)

(52) U.S. Cl. .................... 280/163; 280/166; 182/127

(58) Field of Classification Search ............ 280/163, 280/164.1, 164.2, 165, 166; 182/127
See application file for complete search history.

(56) References Cited

U.S. PATENT DOCUMENTS

| | | | |
|---|---|---|---|
| 1,128,212 A | 2/1915 | Woolard | |
| 1,327,248 A | 1/1920 | Moody | |
| 2,624,058 A | 1/1953 | Kudrna | |
| 2,721,345 A | 10/1955 | Aken | |
| 3,912,298 A | 10/1975 | Humphrey | |
| 4,021,071 A | 5/1977 | Norman | |
| 4,079,815 A | 3/1978 | Cormier | |
| 4,606,433 A * | 8/1986 | Smalley et al. ............ 187/200 |
| 5,205,603 A | 4/1993 | Burdette, Jr. | |
| 5,397,143 A | 3/1995 | Bird | |
| 5,584,493 A | 12/1996 | Demski et al. | |
| 5,624,127 A | 4/1997 | Arreola et al. | |
| 5,803,475 A * | 9/1998 | Dick ........................ 280/163 |
| 5,803,523 A | 9/1998 | Clark et al. | |
| 5,941,342 A * | 8/1999 | Lee ........................... 182/95 |
| 6,213,486 B1 * | 4/2001 | Kunz et al. ................ 280/166 |
| 6,270,139 B1 | 8/2001 | Simpson | |
| 6,986,402 B1 * | 1/2006 | Hedley et al. ............... 182/95 |
| 2003/0071434 A1* | 4/2003 | Budd ........................ 280/166 |

* cited by examiner

*Primary Examiner*—Christopher P. Ellis
*Assistant Examiner*—John Walters
(74) *Attorney, Agent, or Firm*—Foley & Lardner LLP

(57) ABSTRACT

A retractable step system for providing access to and from an elevated platform of a vehicle. The retractable step system is configured to move between a use position and a stowed position. The retractable step system comprises a pair of longitudinal rails which are extended when the system is in the use position and collapsed when the system is in the stowed position. The system further comprises an auxiliary platform assembly rotatably coupled near the platform, and a step structure coupled to the longitudinal rails for providing a user with an intermediate surface upon which to step.

38 Claims, 6 Drawing Sheets

RETRACTABLE STEP SYSTEM

FIELD

The present invention generally relates to a vehicle having an elevated platform or surface. In particular, the present invention relates to a vehicle having a step assembly or system used to provide access to and from an elevated platform, such as an elevated platform of an emergency response type vehicle. The present invention further relates to a step system that is movable by a user between a stowed position and a use position.

BACKGROUND

Many vehicles have elevated surfaces or platforms that must be made accessible to a user. For example, emergency response type vehicles, such as firefighting vehicles, typically have an elevated platform for supporting firefighting equipment. As can be appreciated, the firefighters must be able to quickly and efficiently access the elevated platform. Similarly, cargo trucks, such as box trucks and semi-trucks pulling a trailer, have an elevated platform for supporting cargo. A user of such a truck must have access to and from the elevated platform in order to load and unload the truck.

The use of step assemblies to provide access to an elevated surface of a vehicle is generally known. It is further known to provide a step assembly that is mounted to the tailgate of generally light-weight trucks to provide access to the bed of the truck. A problem encountered with larger vehicles having tailgates, or other auxiliary platforms, is that the tailgates are often heavy and difficult for a single user to move. If a step assembly were to be coupled to such a tailgate, the increased weight of the step assembly may make the tailgate even more difficult to move. In addition, auxiliary platforms of larger vehicles are often higher than those of smaller vehicles. As such, it may be more difficult to lift or otherwise move a step assembly on a larger vehicle than on a smaller vehicle.

It is also known to provide a step assembly that is supported by the ground when the step assembly is in a use position. In several vehicular applications, users are commonly confronted with having to access an elevated platform of the vehicle when the vehicle is positioned on an uneven surface or softened ground. Deployment or use of a step assembly supported by the ground may be complicated because of such conditions.

Accordingly, it would be desirable to provide a step assembly that is suitable for use with larger vehicles, such as emergency response vehicles. It would further be desirable to provide a step assembly that can be moved between a stowed position and a use position by a single user. It would also be desirable to provide a step assembly that reduces the weight that a user must support when moving the step assembly between a stowed and use position. It would further be desirable to provide a step assembly that reduces the height that a user must lift the step assembly when moving the step assembly from a use position to a stowed position. It would further be desirable to provide a step assembly that can be used effectively regardless of any irregularities in the surfaces upon which a vehicle is positioned. It would also be desirable to provide a step assembly that is not supported by the ground when in a use position.

It would be advantageous to a system or the like of a type disclosed in the present application that provides any one or more of these or other advantageous features. The present invention further relates to various features and combinations of features shown and described in the disclosed embodiments. Other ways in which the objects and features of the disclosed embodiments are accomplished will be described in the following specification or will become apparent to those skilled in that art after they have read this specification. Such other ways are deemed to fall within the scope of the disclosed embodiments if they fall within the scope of the claims which follow.

SUMMARY

According to one embodiment, a vehicle includes a vehicle body support by a plurality of wheels, first and second upper rails movably supported at the vehicle body, first and second lower rails movably coupled to first and second upper rails respectively, a step structure supported by first and second lower rails, and an auxiliary platform. The auxiliary platform includes a first frame and a second frame. The first frame is coupled near the vehicle body at a first end about a first axis of rotational. The first frame is coupled to the second frame at a second end about a second axis of rotation. The auxiliary platform is movable between an extended position in which the first frame and the second frame are substantially horizontal, and a retracted position in which the auxiliary platform rotates about the first and second axes of rotation.

According to another embodiment, a retractable step system providing access to and from an elevated platform of a vehicle includes first and second upper rails configured to be movably supported in a slidable and rotational manner at the vehicle, first and second lower rails configured to be movably coupled to first and second upper rails respectively, a step structure supported by the first and second lower rails, and an auxiliary platform. The auxiliary platform has a first portion configured to be rotatably coupled near the vehicle and a second portion configured to be coupled to lower portions of first and second upper rails. The retractable step system is configured to move between a stowed position and a use position. The rotational movement of the auxiliary platform is configured to move the retractable step system into the stowed position. Clearance is provided between lower ends of the first and second lower rails and the ground when the retractable step system is in the use position.

According to another embodiment, a retractable step system for use with a vehicle having an elevated platform includes first and second upper rails movably supported by the vehicle, first and second lower rails movably coupled to first and, second upper rails respectively, a step structure supported by the first and second lower rails, and an auxiliary platform. The auxiliary platform includes a first frame, a second frame, and a plate providing a surface for a user to step upon. The auxiliary platform is configured to be movable between a use position and a stowed position. The plate is support by the first and second frames in the use position. The plate is separated from the second frame in the stowed position.

The present invention relates to a method of producing a retractable step assembly for providing access to an elevated platform of a vehicle. The method includes the steps of providing a first upper rail and a second upper rail, providing a first lower rail and a second lower rail rotationally attached to the first upper rail and the second upper rail and configured to move between an extended position and a retracted position, providing a step structure coupled to the first lower rail and the second lower rail and configured to provide a step surface between the ground and the elevated platform, providing a mount configured to movably couple the first upper rail and the second rail to the vehicle in a slidable and rotational manner, and providing an auxiliary platform assembly. The auxiliary platform assembly has a first frame, a second frame, and a plate. The method further includes the steps of configuring the auxiliary platform assembly to move between an extended position and a retracted position, and configuring the second frame to rotate towards the first frame when the auxiliary platform is moved from the extended position to the retracted position.

DETAILED DESCRIPTION

Figure 1:
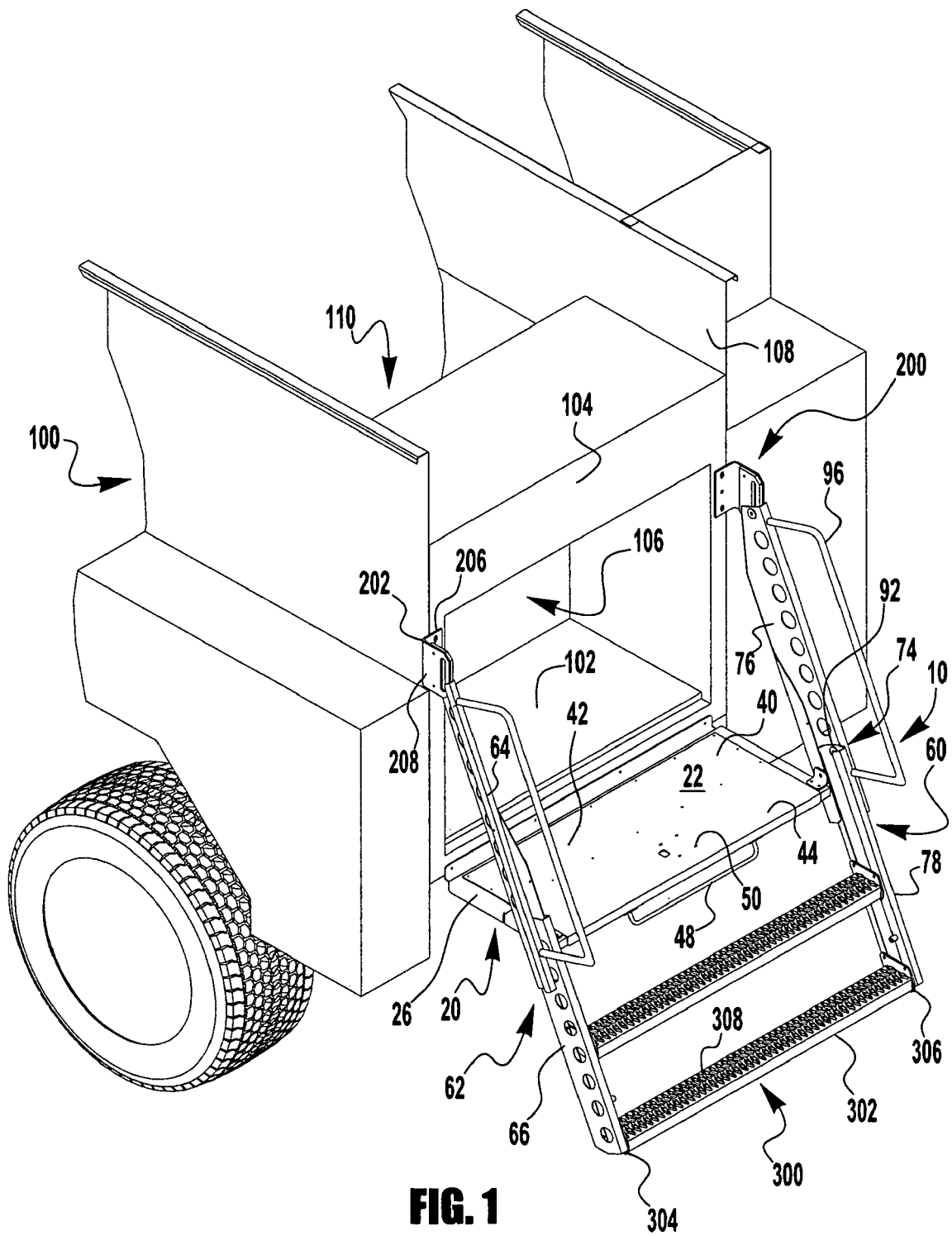
FIG. 1 is a front perspective view of a retractable step system coupled to a vehicle according to an exemplary embodiment illustrated in a use position.

Before proceeding with the description of a number of exemplary embodiments of the invention in detail, it is to be understood that the invention is not limited to the details or methodology set forth in the following description or illustrated in the drawings. The invention is capable of other embodiments or being practiced or carried out in various ways. It is also to be understood that the phraseology and terminology employed herein is for purpose of description and should not be regarded as limiting.

In general, the retractable step system described in this disclosure comprises a system intended to be attached to a vehicle for providing an improved means for ingress and egress to and from an elevated platform (e.g., surface, portion, etc.) of the vehicle. The retractable step system is configured to be movable between a stowed position and a use position. In the use position, the retractable step system provides at least one intermediate surface for a user to step upon when entering or exiting the platform. The retractable step system is configured so that the ground is not used to support the system when in the use position. Such a configuration allows the retractable step system to be used effectively regardless of any variations in the ground (e.g., inclined surfaces, uneven terrain, soft ground, etc.) In the stowed position, the retractable step system is retracted (i.e., collapsed, folded, etc.) and aligned substantially flat with a portion of the vehicle to reduce the amount of space that the system occupies. The retractable step system is intended to be configured in such a manner that a single user can move the system between the stowed position and the use position. This may be accomplished by reducing the amount of weight that a user must support when moving the system, and/or by reducing the height that a user must lift the system when moving the system from the use position to the stowed position.

The retractable step system may be employed in a variety of applications, and is generally applicable with any vehicle having an elevated platform to which access by a user may be desirable. In one application, the retractable step system is employed with an emergency response type vehicle (e.g., firefighting vehicles, military firefighting vehicles, ambulances, toxic cleanup vehicles, etc.) having an elevated platform configured to support equipment, such as fire fighting equipment (e.g., fire hoses, self contained breathing apparatuses, ladders, tools, etc.). While the disclosed embodiments may be described as a retractable step system for use with an emergency response type vehicle, the features of the disclosed embodiments are equally applicable with other vehicles such as cargo trucks, vans, buses, military vehicles, trailers, train cars, boats, and any other vehicle where an improved means for ingress and egress would be beneficial.

Referring to FIGS. 1 through 6, a retractable step system 10 is shown coupled to a vehicle 100. For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Vehicle 100 includes a body having an elevated (i.e., raised, heightened, relatively high, etc.) surface or platform 102 coupled to a vehicle chassis (not shown). Platform 102 is designed to support a variety of objects and articles, such as fire fighting equipment (e.g., fire hoses, self contained breathing apparatuses, ladders, tools, etc.). Platform 102 is further designed to support the weight of a typical user, and according to various exemplary embodiments may be designed to support a plurality of individuals (e.g., firefighters, troops, passengers, etc.).

Referring to FIG. 1, vehicle 100 further includes a structure 104 defining an opening 106 through which a user may gain access to platform 102. In the particular embodiment illustrated, structure 104 is a rear wall of vehicle 100. According to various alternative embodiments, structure 104 may be any portion of a vehicle, such as a sidewall or a front wall. The illustration of structure 104 as a wall portion of a vehicle is not intended to be limiting. It should be understood that structure 104 may be any structure of vehicle 100 that is capable of supporting retractable step system 10 and providing access to platform 102. For example, structure 104 may be a door frame system, support posts, or columns coupled to vehicle 100.

As shown, vehicle 100 further includes sidewalls 108 that extend upward from platform 102. In this manner, platform 102, sidewalls 108, and structure 104 at least partially define a cavity 110 (e.g., receptacle, storage compartment, etc.). A movable member (e.g., divider, gate, panel, partition, etc.), shown as door 111, is optionally positioned in front of opening 106 to further define cavity 110.

Figure 2:
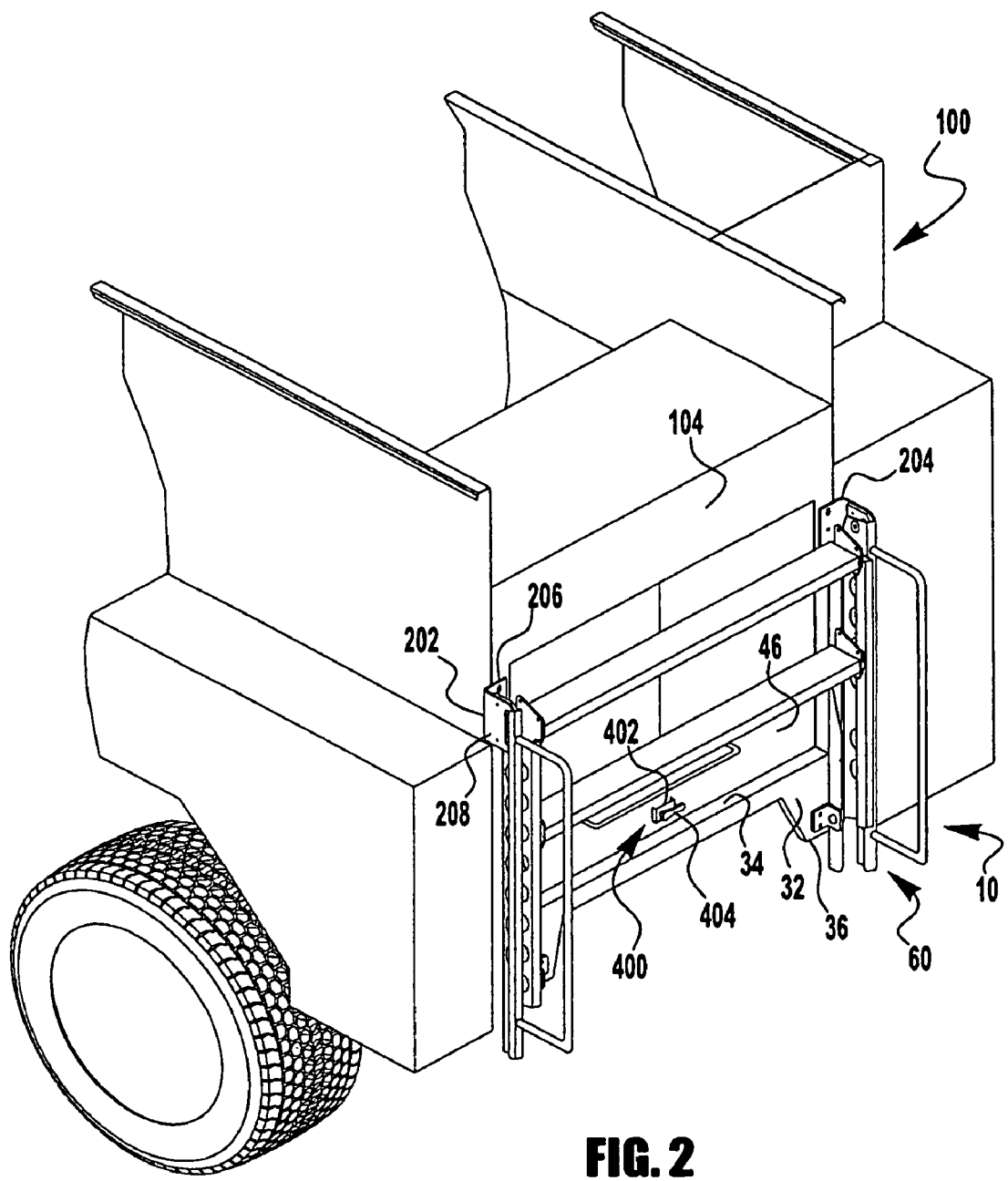
FIG. 2 is a front perspective view of a retractable step system coupled to a vehicle according to an exemplary embodiment illustrated in a stowed position.
Figure 3:
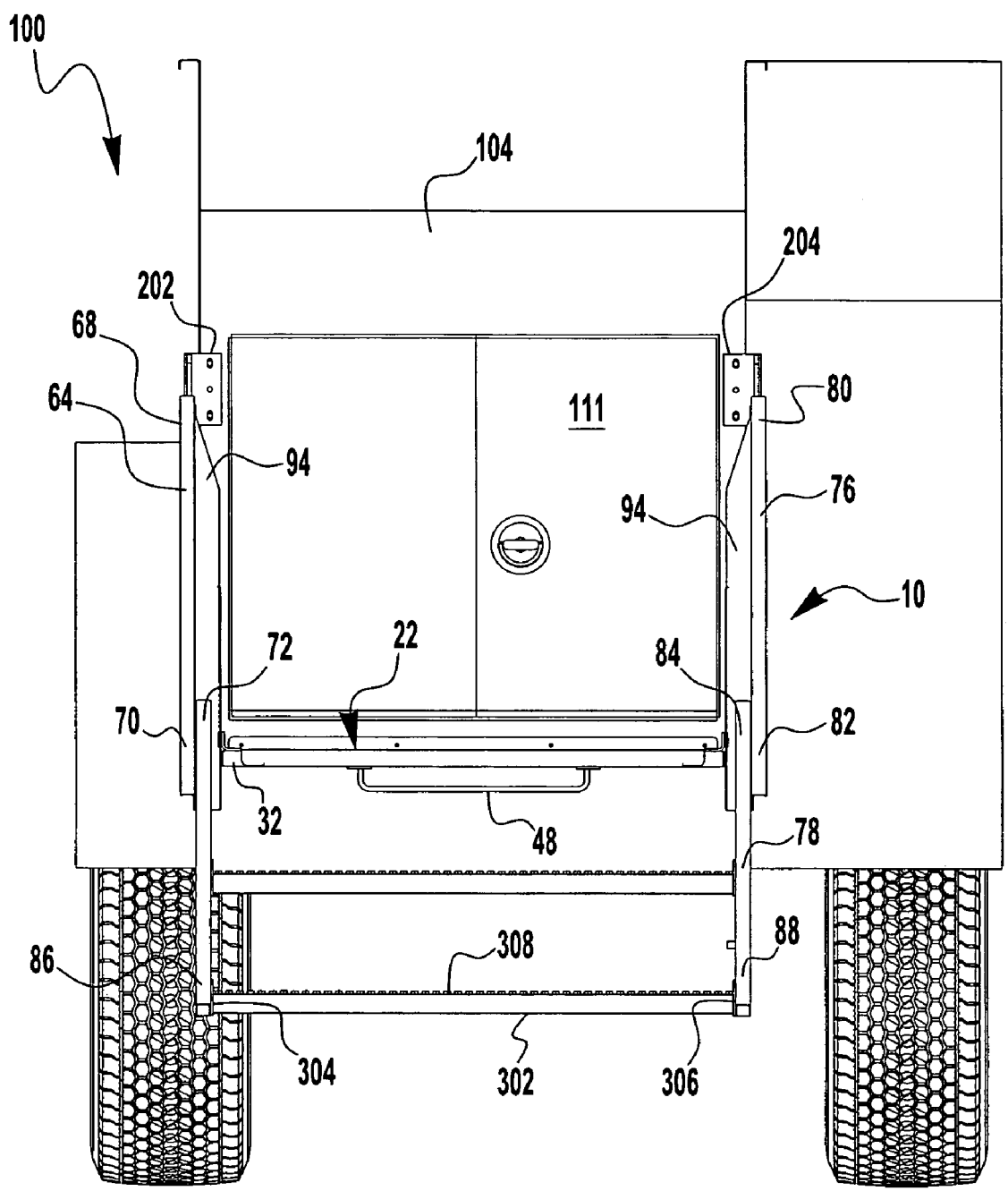
FIG. 3 is a front plan view of a retractable step system coupled to a vehicle according to an exemplary embodiment illustrated in a use position.

FIGS. 1 and 3 illustrates retractable step system 10 being mounted to structure 104 near opening 106 to provide access to platform 102. Referring to FIG. 1, retractable step system 10 generally comprises an auxiliary platform assembly 20, a support system 60, a mounting system 200, and a step structure 300. Auxiliary platform assembly 20, support system 60, mounting system 200, and step structure 300 cooperate to provide a means for egress from or ingress to platform 102 that may be selectively moved by a user between a stowed position (e.g., retracted, folded, collapsed, etc.), as shown in FIG. 2, and a use position (e.g., extended, deployed, etc), as shown in FIG. 1. A latching system 400 is optionally included with retractable step system 10 to releasably retain the system in the stowed position.

Figure 4:
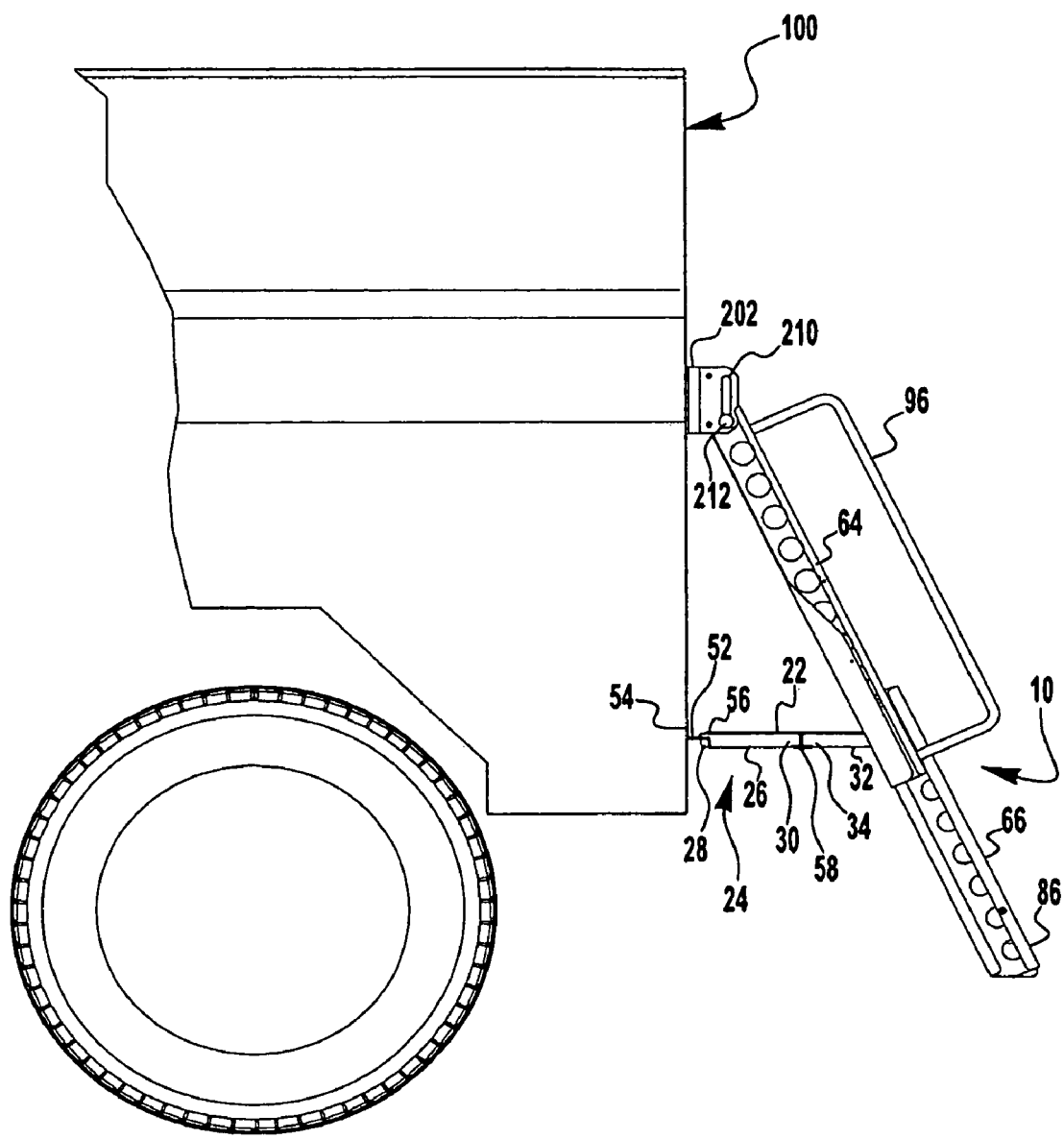
FIG. 4 is a side view of a retractable step system coupled to a vehicle according to an exemplary embodiment illustrated in a use position.

FIGS. 1, 3, and 4 illustrate auxiliary platform assembly 20 in a first position (i.e., use position, deployed position, etc.). Auxiliary platform assembly 20 provides a selectively movable extension to vehicle 100, and preferably an extension to platform 102. Auxiliary platform assembly 20 is movable by a user between the first position, wherein auxiliary platform assembly 20 is substantially parallel with platform 102, and a second position (shown in FIGS. 2 and 6), wherein auxiliary platform assembly 20 is substantially perpendicular with platform 102.

Auxiliary platform assembly 20 may provide necessary clearance between step structure 300 and portions of vehicle 100 (e.g., bumpers, hitches, hose attachments, etc.) by outwardly extending step structure 300 from vehicle 100. Auxiliary platform may further provide for improved means of loading and/or unloading vehicle 100 and platform 102.

Figure 5:
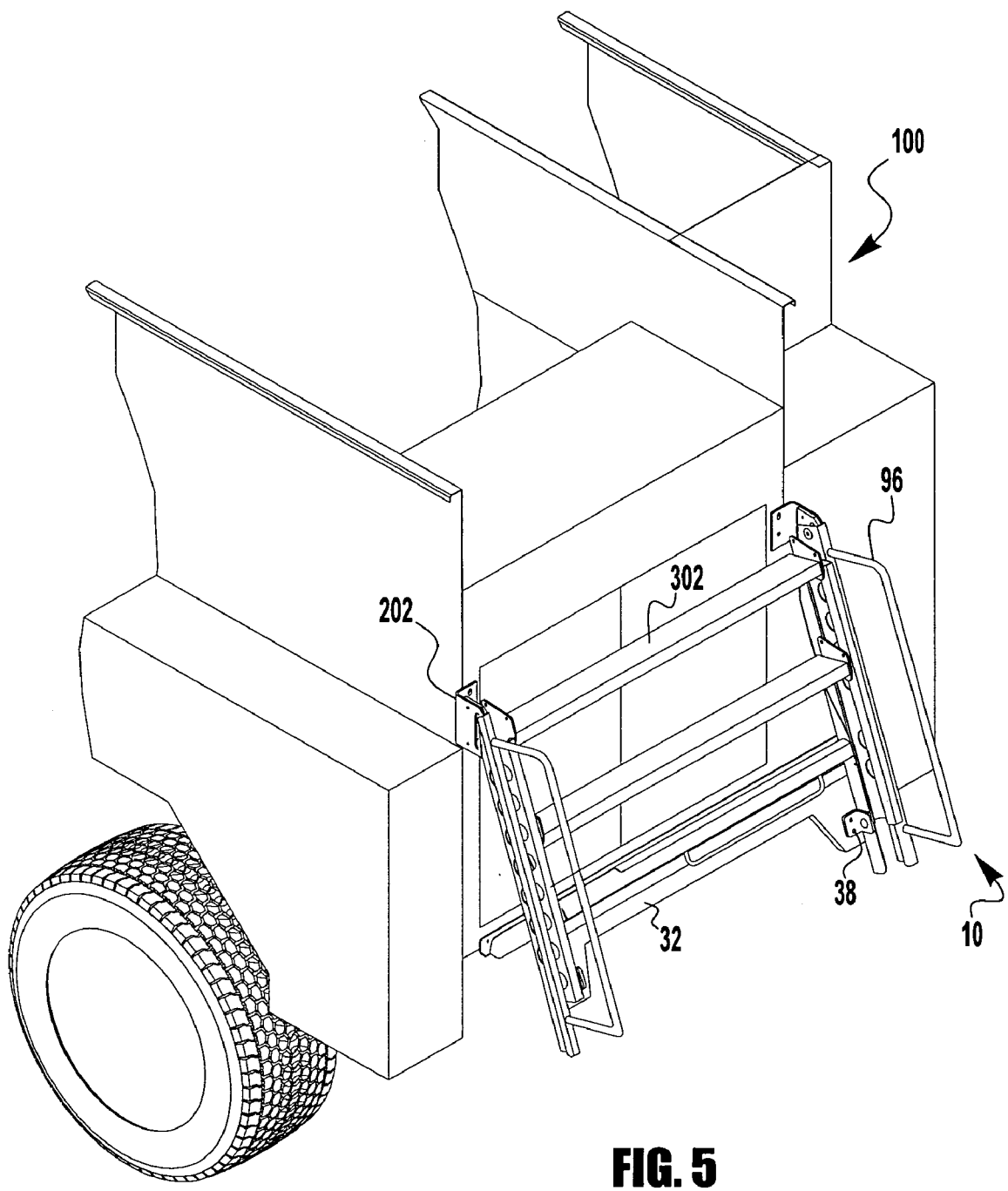
FIG. 5 is a front perspective view of a retractable step system coupled to a vehicle according to an exemplary embodiment illustrated in an intermediate position.

Referring to FIGS. 1 and 5, auxiliary platform assembly 20 generally comprises a plate 22 and a frame structure 24. In the first position, plate 22 is placed over and supported by frame structure 24. Plate 22 provides a surface onto which a user may step, and frame structure 24 at least partially provides the structural rigidity for supporting the user.

According to an exemplary embodiment, plate 22 is a substantially rectangular panel having front side 44 (shown in FIG. 1) and a back side 46 (shown in FIG. 2). Front side 44 is the surface upon which a user may step on when retractable step system 10 is in the first position. Back side 46 is shown having a handle 48 (e.g., bar, lever, etc.) that a user may grip when moving retractable step system 10 between the use and stowed position. Handle 48 may be mounted to back side 46 with fasteners 50, or alternatively may be coupled to back side 46 with any other suitable means such as welding, adhesives, etc. Back side 46 is further shown to include latching system 400. As will be explained in greater detail below, latching system 400 enables a user to selectively lock retractable step system 10 in the stowed position.

In the particular embodiment illustrated, auxiliary platform assembly 20 is configured in a manner that is intended to reduce the height that a user must raise retractable step system 10 when moving the system from the use position to the stowed position. The configuration is further intended to reduce the amount of weight that a user must support when moving auxiliary platform assembly 20.

Referring to FIG. 4, frame structure 24 comprises a first frame section 26 and a second frame section 32. First frame section 26 is movable relative to second frame section 32 between an extended position and a folded position. When auxiliary platform assembly 20 is in the first position, first frame section 26 and second frame section 32 are in the extended position and provide structural support to plate 22 According to an exemplary embodiment, second frame section 32 folds or otherwise collapses towards first frame section 26 to the folded position as auxiliary platform assembly 20 is being moved from the first position to the second position (shown in FIG. 2). In the folded position, first frame section 26 and second frame section 32 are generally vertically aligned, with plate 22 being supported by first frame section 26.

Referring to FIGS. 1 and 4, first frame section 26 is illustrated as being a substantially rectangular member that includes a rear edge 28 that is configured for rotational movement relative to vehicle 100 and a front edge 30 that is configured for rotational movement relative to a rear edge 34 of second frame section 32. According to an exemplary embodiment, first frame section 26 is rotationally attached to vehicle 100. Rotational attachment between first frame section 26 and vehicle 100 may be accomplished by a pivot mechanism 52 shown schematically as a hinge, but may be any suitable rotational movement device (e.g., interlocking tabs, a pivot shaft, and the like) that allows auxiliary platform assembly 20 to move between the first position and the second position. In the particular embodiment illustrated, pivot mechanism includes a first mounting portion 54 coupled to structure 104 of vehicle 100 and a second mounting portion 56 coupled to first frame section 26. According to an alternative embodiment, second mounting portion may be coupled to plate 22.

Referring to FIG. 1, first frame section 26 is coupled to plate 22 by way of fasteners 42. Fasteners 42 may be any suitable attachment means (e.g., bolts, clips, screws, pins, clamps, hooks, etc.). According to various alternative embodiments, first frame section 26 may be welded to plate 22, or secured to plate 22 with an adhesive. According to an additional alternative embodiment, first frame section 26 may be integrally formed with rear portion 40 of plate 22.

Referring to FIGS. 2 and 5, second frame section 32 includes rear edge 34 that is configured for rotational movement relative to front edge 30 of first frame section 26, and a front edge 36 that is coupled to support structure 60. According to an exemplary embodiment, second frame section 32 is rotationally attached to first frame section 26. Rotational attachment between second frame section 32 and first frame section 26 may be accomplished by a pivot mechanism 58 shown schematically as a hinge, but may be any suitable rotational movement device (e.g., interlocking tabs, a pivot shaft, and the like) that allows second frame section 32 to collapse towards first frame section 26. Referring to FIG. 2, front edge 36 is coupled near support system 60 at a connector 38. As shown, connector 38 may include a bracket having a first portion coupled to second frame section 32 and a second portion coupled to support system 60. Fasteners, such as bolts, screws, pins, and the like may be used to couple the bracket to second frame section 32 and support system 60. According to an exemplary embodiment, second frame section 32 is rotatably coupled to support system 60 by connector 38.

FIGS. 2 and 5 illustrate that second frame section 32 is not fixedly mounted to plate 22. When in the use position, second frame section 32 is configured to receive and support plate 22, but in the stowed position, second frame section 32 is separated from plate 22. Such a configuration enables the weight that a user must support when moving the system to be reduced. A user moves auxiliary platform assembly 20, and particularly plate 22, when raising or lowering retractable step system 10. As can be appreciated, the weight of the structural support for auxiliary platform assembly 20 may add increased weight to plate 22. By separating second frame section 32 from plate 22 as a user is moving the system, the weight that the users is moving (i.e., plate 22) is reduced. Such a configuration further reduces the height that a user must lift the system to reach the stowed position. By coupling second frame section 32 to support system 60, rather than coupling plate 22 to support structure 60, the arc length that a user must move the system is reduced when second frame section 32 collapses towards first frame member 26.

According to an alternative embodiment, plate 22 may be omitted entirely from auxiliary platform assembly 20. In such a configuration, at least one of first frame section 26 and second frame section 32 may provide the surface upon which a user may step. In such a configuration, an additional user interface may be added to allow the user to move auxiliary platform assembly 20.

Referring to FIGS. 1 and 4, support system 60 is configured to couple step structure 300 to vehicle 100. Support system 60 is coupled to vehicle 100 and auxiliary platform assembly 20. Support system 60 generally comprises longitudinal members 62, 74 that extend outwardly and downwardly from vehicle 100 when retractable step system 10 is in the use position. When retractable step system 10 is in the stowed position, longitudinal members 62, 74 collapse to a substantially flat position wherein longitudinal members 62, 74 are aligned in a generally vertical orientation. According to an exemplary embodiment, longitudinal members 62, 74 are positioned on opposite sides of auxiliary platform assembly 20, but in various alternative embodiments may be positioned anywhere along auxiliary platform assembly 20. Longitudinal members 62, 74 are preferably made of a relatively rigid material, such as steel, and with conventional methods, but alternatively may be made from other suitable materials and with other suitable methods.

Referring to FIGS. 1 and 3, longitudinal members 62, 74 include first frame rail sections, shown as upper rails 64, 76 respectively, and a second frame rail sections, shown as lower rails 66, 78 respectively. Upper rails 64, 76 have first ends 68, 80 that are movably coupled to vehicle 100, and second ends 70, 82 that are movably coupled to first ends 72, 84 of lower rails 66, 78 respectively.

FIGS. 3 and 4 show that in the use position longitudinal members 62, 74 are not supported by the ground and that clearance is provide between the ground and second ends 86, 88 of lower rails 66, 78. Such a configuration allows retractable step system 10 to be used effectively when vehicle 100 is position on an inclined surface, uneven terrain, soft ground, etc. The amount of clearance provided may depend upon the configuration of vehicle 100 and the particular application.

Second ends 70, 82 of upper rails 64, 76 are rotatably coupled to first ends 72, 84 of lower rails 66, 78 respectively to provide movement between an extended position (shown in FIG. 4) and folded position (shown in FIG. 5). FIG. 3 illustrates that lower rails 66, 78 are coupled to the inside of upper rails 64, 76. According to various alternative embodiments, lower rails 66, 78 may be coupled to the outside of upper rails 64, 76, and additionally may be coupled coaxially with upper rails 64, 76 in certain configurations.

The rotational attachment between second ends 70, 82 of upper rails 64, 76 and first ends 72, 84 of lower rails 66, 78 may be provided by pivot mechanisms 92 shown schematically as pivot rods disposed between the upper rails and the lower rails. According various alternative embodiments, pivot mechanisms may be any suitable rotational movement device that allows the lower rails to be folded towards the upper rails.

Referring to FIG. 3, retractable step system 10 optionally includes a stop mechanism 94. Stop mechanism 94 is intended to limit or restrict the pivotal movement of lower rails 66, 78 from pivoting beyond the stowed position as retractable step system 10 is being moved from the use position to the stowed position. Stop mechanism 94 is intended to prevent lower rails 66, 78 from unintentionally striking or otherwise contacting vehicle 100. According to the particular embodiment illustrated, stop mechanism 94 is a flange or channel coupled to upper rails 64, 76 that is configured to receive or accept lower rails 66,78. Stop mechanism 94 may be provided on both upper rails 64, 76, or alternatively may only be provided on only one of upper rails 64, 76. In various alternative embodiments, a stop mechanism may instead be included on structure 104 of vehicle 100, and may further be any suitable stop mechanism that restricts the movement of lower rails 66,78.

Support system 60 further includes a lock means that is intended to secure lower rails 66, 78 to upper rails 64, 76 when retractable step system is in the stowed position to prevent lower rails 66, 78 from inadvertently moving to the use position. In the particular embodiment illustrated, the suitable lock means is provided by a clip or clamping device that is mounted to upper rails 64, 76 and engages lower rails 66, 78. As can be appreciated, suitable lock means may be provided by any of a variety of generally known or appropriate lock means including, but not limited to, locking pins, latches incorporating camming surfaces, straps, hooks, etc.

Support system 60 optionally includes a handrail system 96, shown in FIG. 1, to provide assistance to a user as the user moves up or down retractable step system 10. In the particular embodiment illustrated, handrail system 96 is mounted to upper rails 64, 76. According to various alternative embodiments, handrail system may be coupled to lower rails 66, 78, or may be omitted entirely.

Referring to FIGS. 1 and 3, mounting system 200 movably couples longitudinal member 62, 74 to vehicle 100 and enables retractable step system 10 to move between the use position and the stowed position. Mounting system 200 generally comprises a first mounting bracket 202 and a second mounting bracket 204. First mounting bracket 202 is configured to retain upper rail 64 of longitudinal member 62 in a manner that allows for the rotational and slidable movement of upper rail 64 relative to structure 104, while second mounting bracket 204 is configured to retain upper rail 76 of longitudinal member 74 in a similar manner.

For ease of discussion, first mounting bracket 202 is discussed. FIG. 1 illustrates first mounting bracket 202 as a substantially L-shaped bracket having a first portion 206 coupled to vehicle 100, and a second portion 208 configured to receive first end 68 of upper rail 64. First portion 206 is coupled to vehicle 100 by any appropriate fastener, and second portion 208 includes an aperture (e.g., guide, groove, recess, etc.) shown as an elongated slot 210 extending in a substantially direction. Slot 210 is configured to receive a projection (e.g., follower, pin, etc.) shown as rod 212 that is fixedly coupled near first end 68 of upper rail 64. According to the various alternative embodiments, slot 210 may be provided near first end 68 of upper rail 64 and rod 212 may be fixedly coupled to second portion 208 of first mounting bracket 202. According to an exemplary embodiment, slot 210 has a width that is only slightly greater than the width of rod 212. A bearing surface (not shown) may be optionally included between slot 210 and rod 212 to reduce friction.

Figure 6:
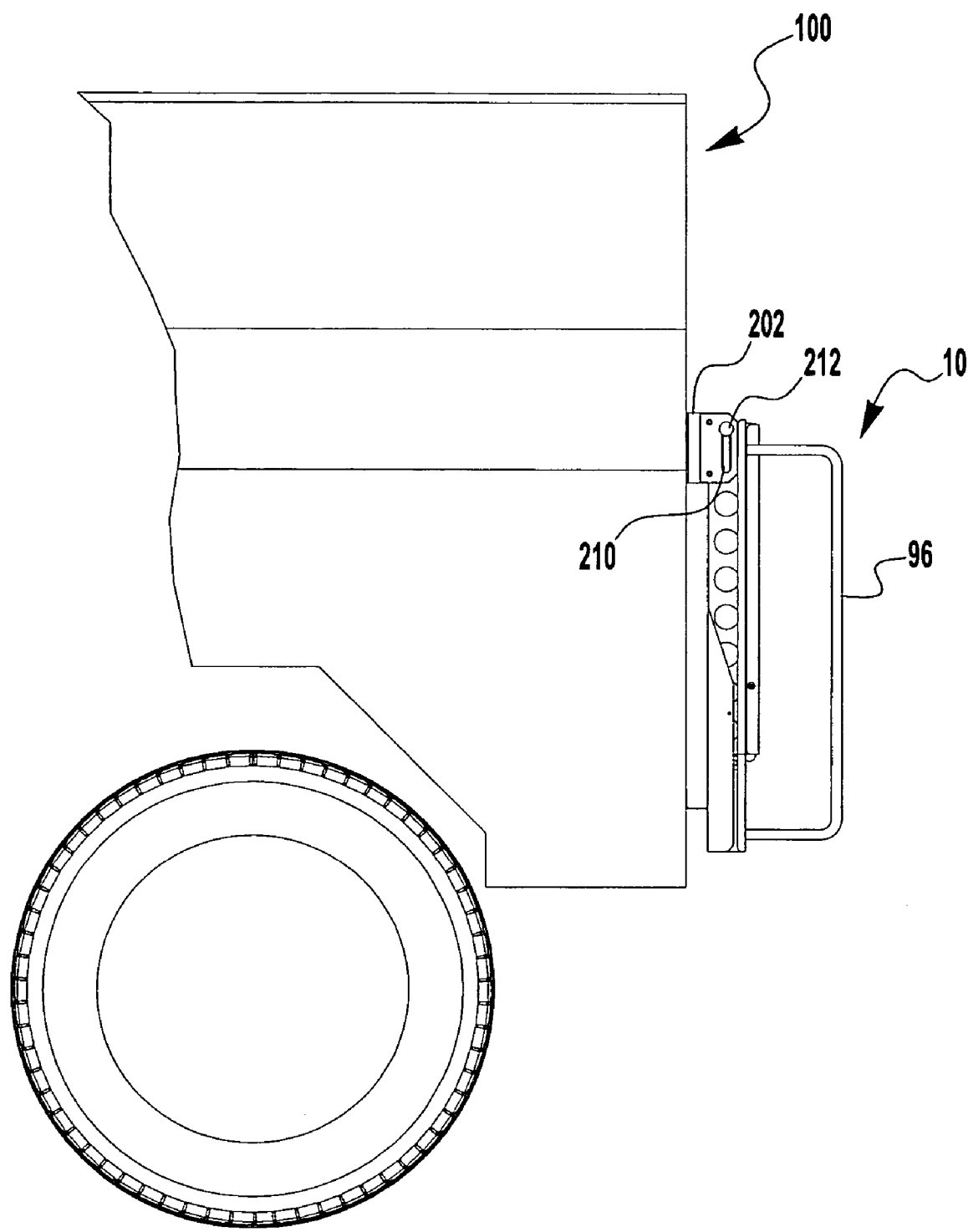
FIG. 6 is a side view of a retractable step assembly coupled to a vehicle according to an exemplary embodiment illustrated in a stowed position.

FIG. 4 illustrates that in the use position, rod 212 is positioned at the bottom of slot 210. FIG. 6 illustrates that in the stowed position, rod 212 is positioned at the top of slot 210. The illustrated configuration of auxiliary platform assembly 20 allows the length of slot 210 to be less than the length would have to be if a one-piece, non-foldable, auxiliary platform was employed. The slot length can be reduced since a user does not have to lift retractable step system 10 as high when moving the system from the use position to the stowed position, as explained above. In alterative embodiments, a one-piece auxiliary platform may be employed, and for such a configuration, the length of slot 210 can be sized accordingly.

Referring to FIGS. 1, retractable step system 10 for use with vehicle 100 further includes step structure 300. Step structure 300 provides an intermediate surface between the ground and platform 102 for a user to step upon. Step structure 300 generally comprises a cross member 302. Cross member 302 includes a first end 304 and a second end 306. Cross member 302 is coupled between longitudinal members 62, 74 such that cross member 302 is positioned substantially perpendicular to longitudinal members 62, 74. According to the particular embodiment illustrated, first end 304 is coupled to lower rail 66 and second end 306 is coupled to lower rail 76. Cross member 302 further includes a step surface 308 configured to support a user. According to an exemplary embodiment, cross member 302 is coupled to first longitudinal members 62, 74 in a manner so that when retractable step system 10 is in the use position, step surface 308 is generally parallel with auxiliary platform assembly 20.

According to an exemplary embodiment, retractable step system 10 comprises two cross members 302 for allowing a user to reach platform 102. As illustrated in FIG. 1, a first cross member is positioned just below auxiliary platform assembly 20, while a second cross member is position near the bottom of lower rails 66, 78. According to various alternative embodiments, any suitable number of cross members may be used. In addition, in alternative embodiments, cross member 302 may be coupled to upper rails 64, 76.

According to various exemplary embodiments, step surface 308 may include a textured surface that is intended to increase friction between a user and the step surface to provide improved traction. Step surface 308 may further include a structure having missing portions or a grated surface. The addition of missing portions or a grated may allow cross member 302 to be self-draining thereby reducing the likelihood of having a slick or slippery surface, and may reduce the likelihood of the formation of ice on the steps if retractable step system 10 is being used in a relatively cold environment.

Retractable step system 10 may further include latching system 400. Latching system 400 is configured to releasably retain retractable step system 10 in the stowed position. According to an exemplary embodiment, a user actuates latch system 400 before moving retractable step system 10 from the stowed position to the use position. Latch system 400 is intended to prevent and protect against unintended movement or deployment of retractable step system 10.

Referring to FIG. 2, latching system 400 generally comprises a lever 402 that is coupled to auxiliary platform assembly 20. Lever 402 includes a user interface, shown as a handle 404, that a user may use to actuate latching system 400. Lever 402 further includes a locking portion (not shown) that is configured to releasably engage a corresponding portion coupled to vehicle 100.

According to an exemplary embodiment, retractable step system 10 is configured so that a typical user alone may move the system between the stowed and use positions. FIG. 2 illustrates retractable step system 10 in the stowed position, wherein the system is collapsed and folded to a position that is substantially parallel with structure 104. Retractable step system 10 is deployed by unlatching latching mechanism 400, if included. Once unlatched, a user may pull on handle 48 to move auxiliary platform assembly 20 from the first position to the second position. As auxiliary platform assembly 20 is being moved, longitudinal members 62, 74 are angled away from vehicle 100. A user may then rotate lower rails 66, 78 to the extended position.

It is also important to note that the construction and arrangement of the elements of the retractable step system as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, or the length or width of the structures and/or members or connectors or other elements of the system may be varied. It should be noted that the elements and/or assemblies of the system may be constructed from any of a wide variety of materials that provide sufficient strength or durability, in any of a wide variety of colors, textures and combinations. It should also be noted that the step members may be configured in a suitable cross sectional shape (e.g. rectangular, triangular, oval, etc.). Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A vehicle comprising:
   a vehicle body supported by a plurality of wheels;
   first and second upper rails movably supported at the vehicle body;
   first and second lower rails movably coupled to first and second upper rails;
   a step structure supported by the first and second lower rails; and
   an auxiliary platform including:
   a first frame supported at the vehicle about a first axis of rotation;
   a second frame supported at the first frame about a second axis of rotation; and
   a plate having a first surface and a second surface, the first surface is adapted to be stepped upon by a user,
   wherein the auxiliary platform is movable to an extended position in which the first frame and the second frame support the plate.

2. The vehicle of claim 1, wherein the plate is directly coupled to one of the first frame and the second frame.

3. The vehicle of claim 1, wherein the plate is releasably supported by one of the first frame and the second frame when the auxiliary platform is in the extended position.

4. The vehicle of claim 3, wherein the plate is coupled relative to the first frame.

5. The vehicle of claim 4, wherein the plate is a separate member fixedly coupled to the first frame.

6. The vehicle of claim 4, wherein the plate is integrally formed with the first frame.

7. The vehicle of claim 4, wherein the plate is separated from the second frame when the auxiliary platform is in the retracted position.

8. The vehicle of claim 7, wherein a user interface is coupled to the second surface of the plate and is configured to assist a user in moving the auxiliary platform between the extended and retracted positions.

9. The vehicle of claim 7, wherein a latching mechanism is coupled to the second surface of the plate and is configured to releasably retain the plate to the vehicle.

10. The vehicle of claim 1, wherein the first and second upper rails are movably supported by a mounting system coupled to the vehicle, the mounting system allows for the slidable and rotational movement of the first and second upper rails.

11. The vehicle of claim 10, wherein the mounting system includes a pair of brackets having slots extending in a substantially vertical direction, the slots are configured to movably receive a rod.

12. The vehicle of claim 11, wherein a rod iscoupled near upper portions of the first and second upper rails.

13. The vehicle of claim 12, wherein the rod is positioned near the top of the slots when the auxiliary platform is in the retracted position.

14. The vehicle of claim 12, wherein the rod is positioned near the bottom of the slots when the auxiliary platform is in the extended position.

15. The vehicle of claim 1, wherein the first and second lower rails are rotationally attached to lower portions of the first and second upper rails.

16. The vehicle of claim 15, wherein the first and second lower rails can be rotated between a stowed position in which the first and second lower rails are collapsed towards the first and second upper rails, and a use position in which the first and second lower rails extend from the first and second upper rails.

17. The vehicle of claim 16, wherein lower portions of the first and second lower rails are elevated from the ground when the first and second rails are in the use position.

18. The vehicle of claim 16, further comprising a stop mechanism adapted to restrict the movement of the first and second lower rails when being moved from the use position to the stowed position.

19. The vehicle of claim 18, wherein the stop mechanism includes a channel coupled to at least one of the first and second upper rails which is configured to receiving at least one of the first and second lower rails.

20. The vehicle of claim 1, wherein the vehicle is an emergency response vehicle and the elevated platform is configured to support emergency response equipment.

21. A retractable step system providing access to and from an elevated platform of a vehicle, the system comprising:
first and second upper rails;
first and second lower rails movably coupled to first and second upper rails;
a step supported by the first and second lower rails; and
an auxiliary platform having a first portion configured to be supported at the vehicle and a second portion coupled between the first portion and lower portions of first and second upper rails,
wherein the auxiliary platform is configured to move between a stowed position and a use position,
wherein one of the first portion and the second portion supports a stepping surface in the stowed position, and wherein both of the first portion and the second portion support the stepping surface in the use position.

22. The system of claim 21, wherein the auxiliary platform includes a first frame rotationally attached to a second frame, wherein the first portion of the auxiliary platform is provided on the first frame and the second portion of the auxiliary platform is provided on the second frame.

23. The system of claim 22, wherein the auxiliary platform includes a plate which is positioned over the first frame and second frame when the auxiliary platform is in the use position to define the stepping surface.

24. The system of claim 23, wherein the plate is fixedly coupled to the first frame.

25. The system of claim 21, wherein wherein clearance is provided between lower ends of the first and second lower rails and the ground when the auxiliary platform is in the use position.

26. A retractable step system for use with a vehicle having an elevated platform, the system comprising:
first and second upper rails movably support by the vehicle;
first and second lower rails movably coupled to first and second upper rails;
a step structure supported by the first and second lower rails; and
an auxiliary platform including:
a first frame;
a second frame, and
a plate providing a surface for a user to step upon, wherein the auxiliary platform is configured to be movable between a use position and a stowed position, wherein the plate is supported by the first and second frames in the use position, wherein the plate is separated from the second frame in the stowed position.

27. The system of claim 26, further comprising a mount system for supporting the first and second upper rails.

28. The system of claim 27, wherein the first and second upper rails are movably supported by the mounting system in a manner allowing for the slidable and rotational movement of the first and second upper rails.

29. The system of claim 28, wherein the mounting system includes a pair of brackets having a slots extending in a substantially vertical direction, the slots are configured to movably receive a rod.

30. The system of claim 29, wherein the brackets are coupled to the vehicle above the elevated platform and a rod is coupled near upper portions of the first and second upper rails.

31. The system of claim 30, wherein the rod is positioned near the top of the slots when the auxiliary platform is in the stowed position.

32. The system of claim 31, wherein the rod is positioned near the bottom of the slots when the auxiliary platform is in the use position.

33. The system of claim 26, wherein the plate includes a handle coupled to a bottom surface of the plate.

34. A vehicle comprising:
a step system including at least one rail and a platform, the rail is supported at the vehicle, the platform is supported between the vehicle and the rail and movable between a stowed position and an extended position, the platform includes a first frame rotatably supported at the vehicle about a first axis and a second frame rotatably supported at the first frame about a second axis;

wherein the first frame and the second frame in combination provide a substantially horizontal support surface when the platform is in the use position.

35. The vehicle of claim 34 wherein the platform further comprises a plate for a user to step upon, the plate is supported by the support surface when the platform is in the use position.

36. The vehicle of claim 35 wherein the plate is fixedly supported relative to one of the first frame and the second release and releasably supported to the other one of the first frame and the second frame.

37. The vehicle of claim 34 wherein the at least one rail comprises first and second rails, each including an upper rail and a lower rail, the upper rails are configured for rotational and slidable movement relative to the vehicle.

38. The vehicle of claim 37 wherein the lower rails are configured for rotational movement relative to the upper rails.

* * * * *

UNITED STATES PATENT AND TRADEMARK OFFICE
CERTIFICATE OF CORRECTION

PATENT NO. : 7,111,858 B2　　　　　　　　　　　　　　　　　　　　　　　　　　Page 1 of 1
APPLICATION NO. : 10/874789
DATED : September 26, 2006
INVENTOR(S) : Andrew R. Manser, Kenneth P. Sebo and Daniel Daemmrich It is certified that error appears in the above-identified patent and that said Letters Patent is hereby corrected as shown below:

In the first line of claim 12 (i.e., the 29$^{th}$ line of column 11), please replace "iscoupled" with --is coupled--.

In the first line of claim 25 (i.e., the 20$^{th}$ line of column 12), please replace "wherein wherein" with --wherein--.

Signed and Sealed this

Sixth Day of March, 2007

JON W. DUDAS
*Director of the United States Patent and Trademark Office*